United States Patent
Schneider et al.

(10) Patent No.: US 9,412,044 B2
(45) Date of Patent: Aug. 9, 2016

(54) METHOD OF COMPENSATION OF RESPIRATORY MOTION IN CARDIAC IMAGING

(75) Inventors: Matthias Schneider, Winkelhaid (DE); Hari Sundar, Piscataway, NJ (US); Rui Liao, Princeton Junction, NJ (US); Chenyang Xu, Berkeley, CA (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1177 days.

(21) Appl. No.: 12/767,908

(22) Filed: Apr. 27, 2010

(65) Prior Publication Data
US 2010/0310140 A1    Dec. 9, 2010

Related U.S. Application Data

(60) Provisional application No. 61/185,340, filed on Jun. 9, 2009.

(51) Int. Cl.
| G06K 9/00 | (2006.01) |
| G06K 9/62 | (2006.01) |
| G06T 7/00 | (2006.01) |
| G06T 7/20 | (2006.01) |

(52) U.S. Cl.
CPC ............ *G06K 9/6247* (2013.01); *G06T 7/0034* (2013.01); *G06T 7/208* (2013.01); *G06K 2209/05* (2013.01); *G06T 2207/10081* (2013.01); *G06T 2207/10121* (2013.01); *G06T 2207/20081* (2013.01); *G06T 2207/30048* (2013.01)

(58) Field of Classification Search
CPC ..... G06K 9/6247; G06T 7/0034; G06T 7/208
USPC ......................................... 328/131
See application file for complete search history.

(56) References Cited

U.S. PATENT DOCUMENTS

| 2008/0226149 A1* | 9/2008 | Wischmann et al. | 382/131 |
| 2008/0240536 A1* | 10/2008 | Soubelet et al. | 382/132 |
| 2009/0141968 A1* | 6/2009 | Sun et al. | 382/154 |
| 2010/0074485 A1* | 3/2010 | Movassaghi et al. | 382/128 |
| 2010/0217116 A1* | 8/2010 | Eck et al. | 600/424 |

OTHER PUBLICATIONS

Manke, et al., Novel Prospective Respiratory Motion Correction Approach for Free-Breathing Coronary MR Angiography Using a Patient-Adapted Affine Motion Model, 2003, Magnetic Resonance in Medicine, pp. 122-131.*
Gulsun, et al., Robust Vessel Tree Modeling, 2008, Imaging and Visualization, Siemens Corporate Research, pp. 602-611.*

* cited by examiner

*Primary Examiner* — Luke Gilligan

(57) ABSTRACT

A method (10) for respiratory motion compensation by applying principle component analysis (PCA) on cardiac imaging samples obtained using 2D/3D registration of a pre-operative 3D segmentation of the coronary arteries.

12 Claims, 10 Drawing Sheets

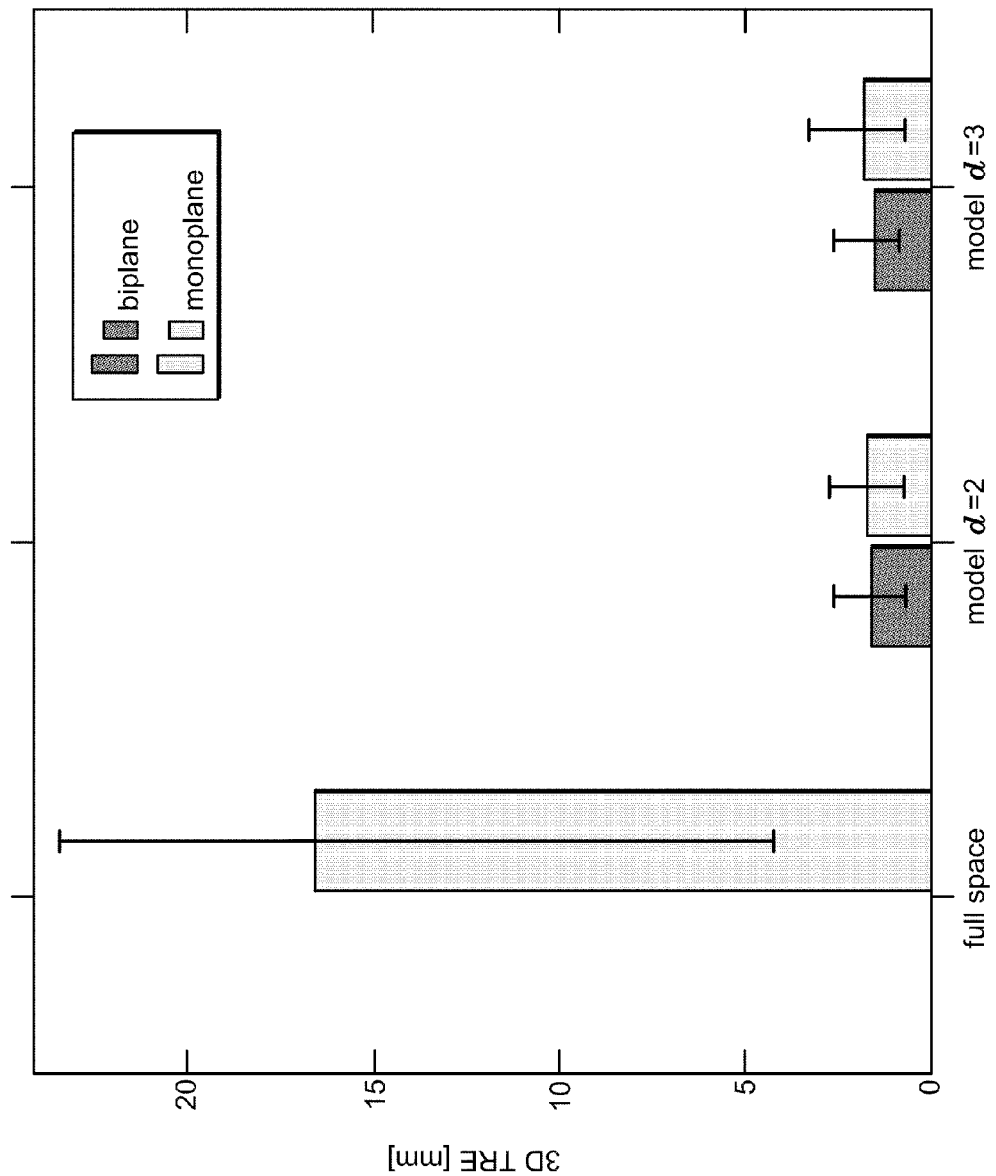

METHOD OF COMPENSATION OF RESPIRATORY MOTION IN CARDIAC IMAGING

CROSS-REFERENCE TO RELATED APPLICATIONS

This application claims the benefit of Provisional U.S. Patent Application Ser. No. 61/185,340 entitled, "Model-Constrained Respiratory Motion Compensation for Cardiac Interventions", filed in the name of Matthias Schneider, Hari Sundar, Rui Liao, and Chenyang Xu on Jun. 9, 2009, the disclosure of which is also hereby incorporated herein by reference.

FIELD OF INVENTION

The present invention relates to cardiac imaging. More particularly, the present invention relates to respiratory motion compensation in cardiac imaging.

BACKGROUND OF THE INVENTION

Complex non-invasive cardiac interventional procedures, such as, cardiac catheter ablation, carotid artery stenting, and percutaneous coronary interventions for chronic total occlusions, are routinely guided by X-ray coronary angiography that provides information about the motion and morphology of the coronary arteries under operation. Although it depends on the interventional procedure, generally, a medical professional inserts an appropriate therapeutic catheter into a blood vessel of the subject patient and advances the catheter to the target site within the vascular tree to perform actions such as deploying stents or ablating tissue. Integrating pre-operative plans into the interventional surgery suite of tasks and applications is a common way to assist the surgeon and other medical professionals during such tasks. So for example, a 3D coronary tree image around the target site can be reconstructed from a preparatory, pre-operative computed tomography (CT) scan of the patient and then overlaid on the intra-operative 2D X-ray fluoroscopy images (i.e., angiograms) to establish one image coordinate system from the different data (this is more fully described in an article by M. A. Gülsün and H. Tek, "Robust Vessel Tree Modeling", MICCAL, Volume 5241 of LNCS (2008), pages 602-611).

This alignment or registration of pre-operative volumetric image datasets with intra-operative images is a well-known technique to help overcome some of the drawbacks of X-ray imaging but it is a computationally demanding and challenging task. Maintaining up-to-date information during the interventional procedure requires continuous re-adjustment of the registration due to cardiac motions (movement of the heart due to the cardiac cycle), bulk patient movements, and respiratory motions (respiratory-induced movement of the heart). Such re-registrations are challenging because of the low quality and lack of soft tissue contrast in intra-operative 2-D X-ray fluoroscopic images. Further, re-registrations are also computationally expensive.

Different techniques have been used or proposed to overcome the problem of cardiac and respiratory motion errors in cardiac imaging. Errors due to cardiac motion can be partly avoided using ECG gating techniques. These are techniques in which image acquisition is triggered by a start pulse derived from an ECG taken from the patient during imaging. Since the human heart rate is usually no slower than 60 beats per minute, ECG gating results in a frame rate for image acquisition of about one frame per second. Similar approaches for respiratory gating in cardiac MR imaging have been investigated, usually using displacement transducers to estimate the breathing phase (this is more fully described in an article by Ehman, et al., "Magnetic resonance imaging with respiratory gating: techniques and advantages", AJR Am J Roentgenol 143(6) (December 1984), pages 1175-1182). However, due to the relatively long breathing cycle of several seconds, the resulting imaging frequency of respiratory-gated angiograms is significantly reduced and is not practical for interventional applications.

Another technique for reducing respiratory motion is the breath-hold technique which requires cooperation on the part the patient (this is more fully described in an article by M. R. Paling and J. R. Brookeman, "Respiration artifacts in MR imaging: reduction by breath holding", J Comput Assist Tomogr 10(6) (1986), pages 1080-1082). Even if this method successfully reduces breathing motion by relatively simple and natural means, it is significantly restricted by the patient's limited ability to perform a supervised breath hold during the treatment (as reported in an article by G. S. Mageras and E. Yorke, "Deep inspiration breath hold and respiratory gating strategies for reducing organ motion in radiation treatment", Semin Radiat Oncol 14(1) (January 2004), pages 65-75).

A third class of techniques addresses the problem of respiratory motion correction by incorporating suitable motion correction models in the imaging from the pre-operative volumetric image datasets (this is described in one article by D. Manke, et al., "Model evaluation and calibration for prospective respiratory motion correction in coronary mr angiography based on 3-d image registration", Medical Imaging, IEEE Trans on 21(9) (September 2002), pages 132-1141) and in another article by A. P. King, et al., "A technique for respiratory motion correction in image guided cardiac catheterisation procedures", Medical Imaging 6918(1) (2008), page 691816). The main drawback of these approaches is that they require manual landmark selection for diaphragm tracking. In another series of studies, a motion model algorithm relying on a parametric 3D+time coronary model has been developed to correct the X-ray images for both cardiac and respiratory motions (more fully described in one article by G. Shechter, et al., "Respiratory motion of the heart from free breathing coronary angiograms", Medical Imaging, IEEE Trans. on 23(8) (August 2004), pages 1046-1056) and by another article by G. Shechter, et al., "Prospective motion correction of x-ray images for coronary interventions", Medical Imaging, IEEE Trans. on 24(4) (April 2005), pages 441-450). However, the motion correction relies on the quality of the estimated motion model and does not consider any further information of the angiograms.

Studies on the respiratory motion of the heart have concluded that this kind of motion has a patient-specific profile (reported in one article by K. McLeish, et al., "A study of the motion and deformation of the heart due to respiration", Medical Imaging, IEEE Trans. on 21(9) (September 2002), pages 1142-1150 and in another article by G. Shechter, et al., "Displacement and velocity of the coronary arteries: cardiac and respiratory motion", Medical Imaging, IEEE Trans. on 25(3) (March 2006), pages 369-375). Even though it is more complex than just 3D translation, the motion profile is restricted in terms of 3D rotation and translation. It would be advantageous to utilize this patient-specific motion profile in developing a motion correction model for respiratory motion compensation in cardiac imaging.

SUMMARY OF THE INVENTION

The present invention obviates the aforementioned problems by providing a method of motion compensation for cardiac imaging of a patient, comprising the steps of:

a. obtaining a pre-operative volumetric image dataset of a cardiac target site for the patient;
b. obtaining an intra-operative image of the target site;
c. performing a registration of the pre-operative volumetric dataset with the intra-operative image;
d. incorporating a model of the respiratory motion made by the patient's heart into the registration to compensate for the respiratory motion; and
e. adjusting the registrations for the intra-operative image and subsequent intra-operative images using the motion model.

The step of obtaining a pre-operative volumetric image dataset may comprise retrieving from a data storage a 3D coronary tree image of the target site. The 3D coronary tree image may be reconstructed from a pre-operative CT scan of the patient. The step of obtaining an intra-operative image may comprise retrieving from a data storage a 2D X-ray fluoroscopic image of the target site. Alternatively, the step of obtaining an intra-operative image may comprise retrieving from a data storage a sequence of intra-operative images of the target site. The sequence of intra-operative images may be an ECG-gated 2D fluoroscopic angiogram sequence.

The step of performing a registration may comprise overlaying the pre-operative volumetric image dataset onto the intra-operative image and optimizing an alignment of the images. Further, the step of performing a registration may comprise overlaying the 3D coronary tree image onto the angiogram sequence of images and optimizing an alignment of the images.

The step of incorporating may comprise defining the motion model using principle component analysis on cardiac imaging samples that are obtained from a pre-operative registration of a volumetric image dataset with an angiogram sequence of the coronary arteries of the patient. The step of incorporating may alternatively comprise defining the model using principle component analysis on cardiac imaging samples that are obtained using 2D/3D registration of a pre-operative 3D segmentation of the coronary arteries with an ECG-gated 2D fluoroscopic angiogram sequence.

The step of adjusting the registrations may comprise restricting the scope of the registrations using prior information of the respiratory motion provided by the motion model. The step of adjusting the registrations may comprise restricting the parameters of optimizing an alignment of the images using prior information of the respiratory motion provided by the motion model.

The method may also comprise a step of performing registrations for subsequent intra-operative images of the target using the motion model. The method may also comprise a step of performing registrations for subsequent intra-operative images of the target and continuously adjusting the registrations due to respiratory motions using the motion model.

The present invention may also provide a method of respiratory motion correction in image-guided cardiac interventions that comprises registering a pre-operative volumetric image with intra-operative images of the cardiac areas of interest, said registering being constrained by a principle component analysis-based model of the respiratory motion of a respective patient's heart. In such case, the motion model may constrain a registration by restricting the parameters of optimizing an alignment of the images using prior information of the respiratory motion.

The present invention may also provide a method of registering a 3D volumetric image dataset with an angiogram that comprises restricting the parameters of optimizing an alignment of the images using prior information of the respiratory motion and displaying the registration to respective users.

Also, the present invention may provide a method of cardiac imaging that comprises registering a pre-operative 3D centerline segmentation of a patient's coronary arteries with an ECG-gated angiogram sequence; applying principle component analysis on a selected number of registration results to model the respiratory motion of the patient's heart; registering subsequent angiograms performed during a cardiac intervention for the patient by using the analysis results to restrict the optimization of image alignments; and presenting the registration results to respective cardiac imaging users.

Advantageously, the present invention provides a cardiac imaging method using model-constrained registration that increases the robustness and accuracy of registrations performed for motion compensation, especially for weak data constraints such as low signal-to-noise ratio or an intra-operative 2D monoplane setting. This then permits reducing radiation exposure to a patient without compromising on registration accuracy. Synthetic data as well as phantom and clinical datasets have been used to validate the method's model-based registration in terms of registration accuracy, robustness, and speed. During validation, the method carried out in accordance with the present invention significantly accelerated the intra-operative registration with a 3D TRE of less than 2 mm using monoplane images, which makes it feasible for motion correction in clinical procedures.

Of further advantage, the present invention provides a principle component analysis (PCA)-based respiratory motion model for motion compensation during image-guided cardiac interventions. This motion model is used as a prior within the intra-operative registration process for motion compensation to restrict the search space.

DESCRIPTION OF THE DRAWINGS

For a better understanding of the present invention, reference is made to the following description of an exemplary embodiment thereof, and to the accompanying drawings, wherein:

FIG. 3($b$) is a chart that shows the mean ratio of converged solutions for initial guesses at different noise levels for the synthetic data validation simulation referenced by FIG. 3($a$);

FIG. 4($b$) is a photograph of an X-ray image of a cardiac phantom with registered "coronary" centerline for the phantom data validation experiment referenced by FIG. 4($a$);

DETAILED DESCRIPTION

Figure 1:
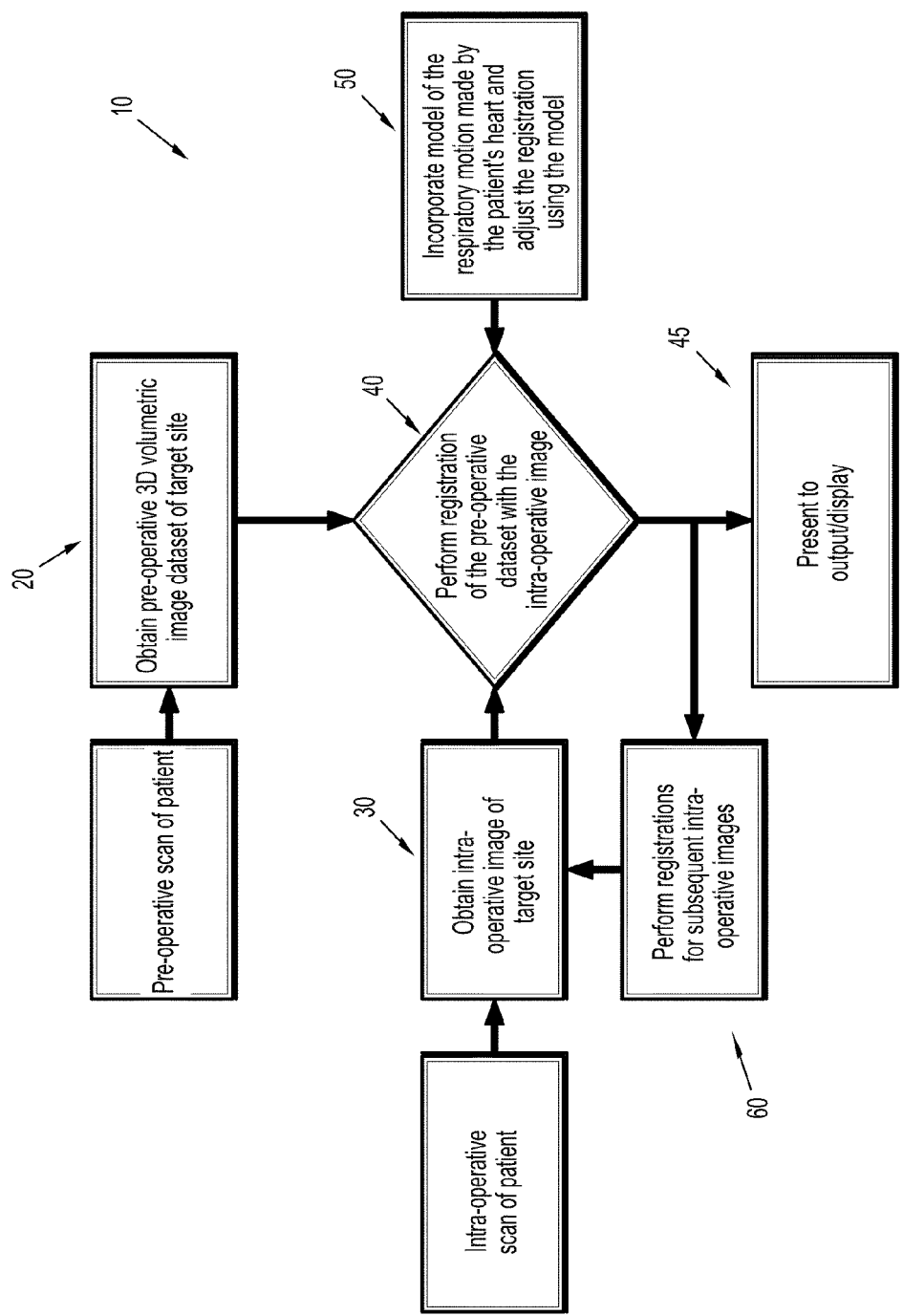
FIG. 1 is an illustration of a method of compensation for respiratory motion in cardiac imaging of a patient carried out in accordance with the present invention.

FIG. 1 shows an illustration of a method 10 for compensation of respiratory motion in cardiac imaging of a subject patient carried out in accordance with the present invention. Step 20 shows that at least one pre-operative volumetric image dataset of the target site of the patient is obtained. An example is a 3D coronary tree image around the target site which is reconstructed from a preparatory, pre-operative CT scan of the patient. The CT scan may be performed using any commercially available CT scanner. The volumetric image dataset may be stored in appropriate data storage and then obtained via retrieval from data storage as described below. As previously noted, the medical professional routinely arranges for pre-operative plans, like the pre-operative volumetric image dataset, to be integrated into the interventional surgery suite of tasks to provide an assist in complex non-invasive cardiac interventional procedures.

In step 30, at least one intra-operative image of the target site is obtained. The intra-operative image is routinely acquired in the course of the medical professional undertaking the tasks associated with the cardiac interventional procedure, such as, inserting an appropriate therapeutic catheter into a blood vessel of the patient; advancing the catheter to the target site within the vascular tree prior to performing an interventional procedure; and actually performing the interventional procedure. These tasks are done with guidance from commonly-available coronary angiography instrumentation and tools, including for example, a 2D X-ray fluoroscope and associated instrumentation like imaging displays, processing workstations, data storage, and telecommunications devices. The angiography instrumentation and tools provide real-time information to the medical professional about the motion and morphology of the coronary areas, like arteries, of interest as well as provide storage and processing for the various image data obtained from the patient, including pre-operative data. Therefore, any or all image data used by the method may be obtained via retrieval from data storage.

The intra-operative image may be, for example, a 2D biplane fluoroscopic angiogram. It is standard practice for the medical professional to acquire a sequence of intra-operative images of the target site while performing the various tasks and, in such case, the method may use ECG-gating to extract a sequence of intra-operative images of the target site. As noted above, the ECG-gating will partly compensate for the cardiac motion and also help to isolate the respiration-induced motion.

In step 40, the method performs a registration of the volumetric image dataset with at least one initial intra-operative image (or image sequence) using familiar registration software and algorithms that are accessed from the angiography instrumentation and tools. The registration overlays the pre-operative volumetric image dataset onto the intra-operative image and optimizes the alignment between the different image data to establish one image coordinate system. For example, the method may use a feature-based rigid 2D/3D registration algorithm optimizing for a rigid transform that best maps a pre-operative 3D centerline segmentation of the coronary arteries to intra-operative 2D angiograms. The coronary centerline may be reconstructed from pre-operative segmented 3D datasets. The angiography instrumentation and tools are then used to present this information, via a desired output such as an imaging display, to the medical professional during the interventional procedure (step 45).

In step 50, the method incorporates a model of the respiratory motion made by the patient's heart into the registration. As will be described below in exemplary detail, the method constructs or defines a motion model which is used by the registration software/algorithm as a prior to compensate for the respiratory motion. In effect, the registrations for the intra-operative image and subsequent intra-operative images are adjusted using the motion model. The adjustment restricts the scope of the registrations using prior information of the respiratory motion ("model-constrained registration"). More particularly, the adjustment restricts the parameters of optimizing an alignment of the images using prior information of the respiratory motion. As will be shown, this will augment and accelerate an unconstrained registration framework.

The motion model may be constructed and then incorporated automatically or mostly automatically using the angiography instrumentation and tools or other processing equipment. Also, the motion model may be constructed and then incorporated pre-operatively well in advance of the interventional procedure or just before or part of the overall operative procedure.

Step 60 shows that the method maintains up-to-date information for the medical professional during the interventional procedure by performing registrations for subsequent intra-operative images of the target site and continuously adjusting the registrations due to respiratory motions by the patient ("re-registrations"). The angiography instrumentation and tools are used to adjust the registration for subsequent intra-operative images of the target site by re-applying the registration algorithm using the motion model.

A patient-specific model of the respiratory motion of the patient's heart is constructed or defined in the following exemplary manner. The present invention provides a method to learn the patient-specific motion and define a motion model by applying, for example, principle component analysis (PCA) on cardiac imaging samples obtained using 2D/3D registration of a pre-operative 3D segmentation of the coronary arteries. The PCA model is subsequently used to constrain registrations performed during interventional procedures. The use of this patient-specific motion model greatly improves the registration accuracy and robustness even when performed using a monoplane fluoroscopic image.

In a preparatory training phase using the angiography instrumentation and tools, a pre-operative 3D segmentation of the coronary arteries is automatically registered with an ECG-gated 2D biplane angiogram sequence. ECG-gating is used to extract a sequence of images showing contrast-enhanced coronary arteries at a fixed cardiac phase, thereby isolating the respiration-induced motion, which is assumed to be rigid. To estimate the pose of the vasculature (i.e., the position and orientation within the coordinate system) in each sequence image, the method may apply a feature-based rigid 2D/3D registration algorithm optimizing for a rigid transform that best maps a pre-operative 3D centerline segmentation of the coronary arteries to the 2D biplane angiograms. The coronary centerline may be reconstructed from pre-operative segmented 3D CT datasets (more fully described in the Gülsün and Tek article noted above). The training phase steps may be accomplished in the same or similar manner as the steps 20, 30 and 40 described above (e.g., the same or similar registration algorithm may be used).

Figure 2:
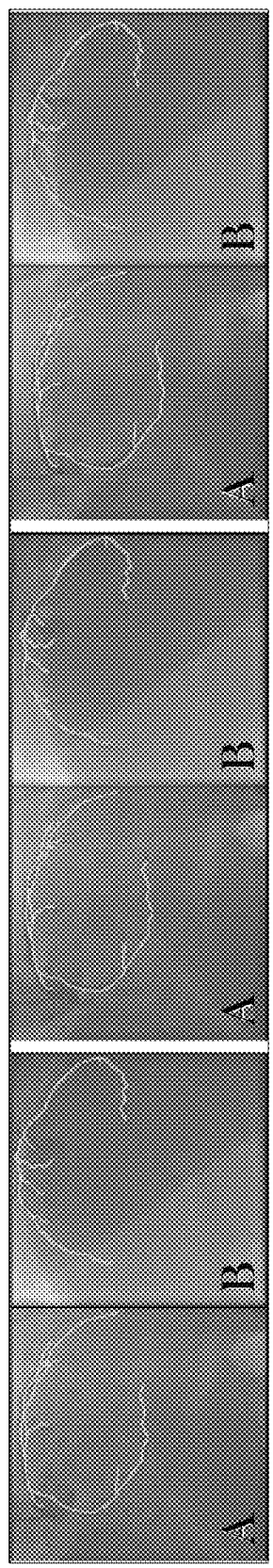
FIG. 2 is a photograph of the first three samples of the ECG-gated 2D biplane angiogram of a patient dataset with registered pre-operative coronary centerline used in the construction of a respiratory motion model of the method of FIG. 1.

As noted above, according to previous studies, the respiratory motion of the heart shows a restricted profile that is patient-specific. To capture and mathematically describe these patient-specific restrictions, the pose of the coronaries of the patient at different breathing phases is analyzed. This is done by using the angiography instrumentation and tools to register 3D segmented coronaries to a sequence of N number of ECG-gated 2D fluoroscopic images. FIG. 2 shows exemplary images of a first three samples of an ECG-gated 2D biplane angiogram of the patient with a registered pre-operative 3D coronary centerline. The registration results are subsequently used as training samples for the motion model.

For each breathing phase, an estimate is obtained for the cardiac pose which is represented by a rigid transform $m_i \in \mathbb{R}^6 (1 \leq i \leq N)$. It is assumed that $m_i$ forms a linear (low-dimensional) sub-manifold embedded in the six dimensional space of rigid 3D transformations. Linear principle component analysis (PCA) is then applied to find the corresponding basis vectors. A singular value decomposition approach is used to compute the eigenvalues $\lambda_i$ and eigenvectors $v_i$ of the covariance matrix $\Sigma$ (more fully described in an article by W. Press, S. Teukolsky, W. Vetterling, and B. Flannery, "Numerical Recipes in C", 2nd ed. Cambridge University Press, Cambridge, UK (1992)). The basis of the d-dimensional linear sub-manifold ($d \leq 6$) is then identified as the first d eigenvectors $v_i$ corresponding to the d largest eigenvalues $\lambda_i$. The spectrum of the covariance matrix $\Sigma$ can be used to find a reasonable value for the dimension d. Finally, a d-dimensional parametric linear motion model $M^d$ is obtained to capture the patient-specific respiratory profile:

$$M^d: \mathbb{R}^d \to \mathbb{R}^6 \text{ and } \alpha \mapsto \overline{m} + \sum_{i=1}^{d} \alpha_i v_i,$$

where $\overline{m}$ is the mean transform $$\overline{m} = \frac{1}{N} \sum_{i=1}^{N} m_i.$$

For the rotation parameterization, the three Euler angles are used. Since this kind of representation has many known drawbacks such as ambiguities and singularities, exponential map parameterization may also be used (more fully described in an article by F. S. Grassia, "Practical parameterization of rotations using the exponential map", J. Graph. Tools, 3(3) (1998), pages 29-48). However, despite the advantages of the exponential map compared over the Euler angles, there are no remarkable differences between the two approaches.

As noted above, an initial sequence of 2D biplane X-ray angiograms has to be acquired prior to the interventional procedure to provide sufficient training samples for the model estimation. Two monoplane sequences from different angulations may also be used as well. Although the patient will be exposed to additional radiation and contrast agent during this training phase, the reduction from the availability of breathing compensated overlay and the possible use of monoplane images for guidance may greatly reduce the overall radiation exposure for the procedure.

The above-constructed patient-specific motion model spans the space of valid configurations that can be assumed during the breathing cycle of the patient. The method restricts or constrains the search space during re-registrations to that estimated by the patient-specific motion model. Specifically, the registration algorithm no longer optimizes for the six parameters describing an arbitrary rigid transform (unconstrained registration) but only for $d \leq 6$ motion model parameters $\alpha$ to estimate the coronaries' pose parameters:

$$\hat{m} = M^d(\arg\min_{\alpha \in \mathbb{R}^d} C_1(I_1, Y_0, M^d(\alpha)) + C_2(I_2, Y_0, M^d(\alpha))),$$

where $C_k(I, Y_0, m)$ ($k \in \{1,2\}$) is a similarity measure describing the distance between the fluoroscopic image I of camera k and the pre-operative 3D coronary centerline $Y_0$ which is transformed according to the rigid mapping m and projected into the camera coordinate system. The values $I_1$ and $I_2$ are two corresponding camera images of the 2D biplane system. For a 2D monoplane setting, $C_2$ is set to zero.

Experiments/simulations using synthetic, phantom, and clinical data have been used to validate the method's model-constrained registration approach. These are described below.

Synthetic data experiment/simulation: A respiratory motion generator was implemented based on a clinical study on human breathing motion providing pose samples of tracked displacement transducers attached to the chest of each of four patients. The covariance matrices for these four sample sets share a sharp spectrum with a prominent first eigenvalue. As can be expected, the corresponding eigenvector describes mostly inferior-superior translation. The motion model estimation within the simulation was based on 8 random samples of each motion generator and validated for another 16 random samples. For the arterial 3D centerline segmentation $Y_0$, a set of uniformly distributed 3D points and a manually segmented CT dataset were both used, with Gaussian noise added to account for inevitable image reconstruction errors that would occur in a clinical setting. The intraoperative 2D biplane angiographies were obtained by transforming the 3D coronary segmentation by a random sample of the motion generator, adding Gaussian noise, and projecting this imaginary 3D observation on two cameras.

Figure 3A:
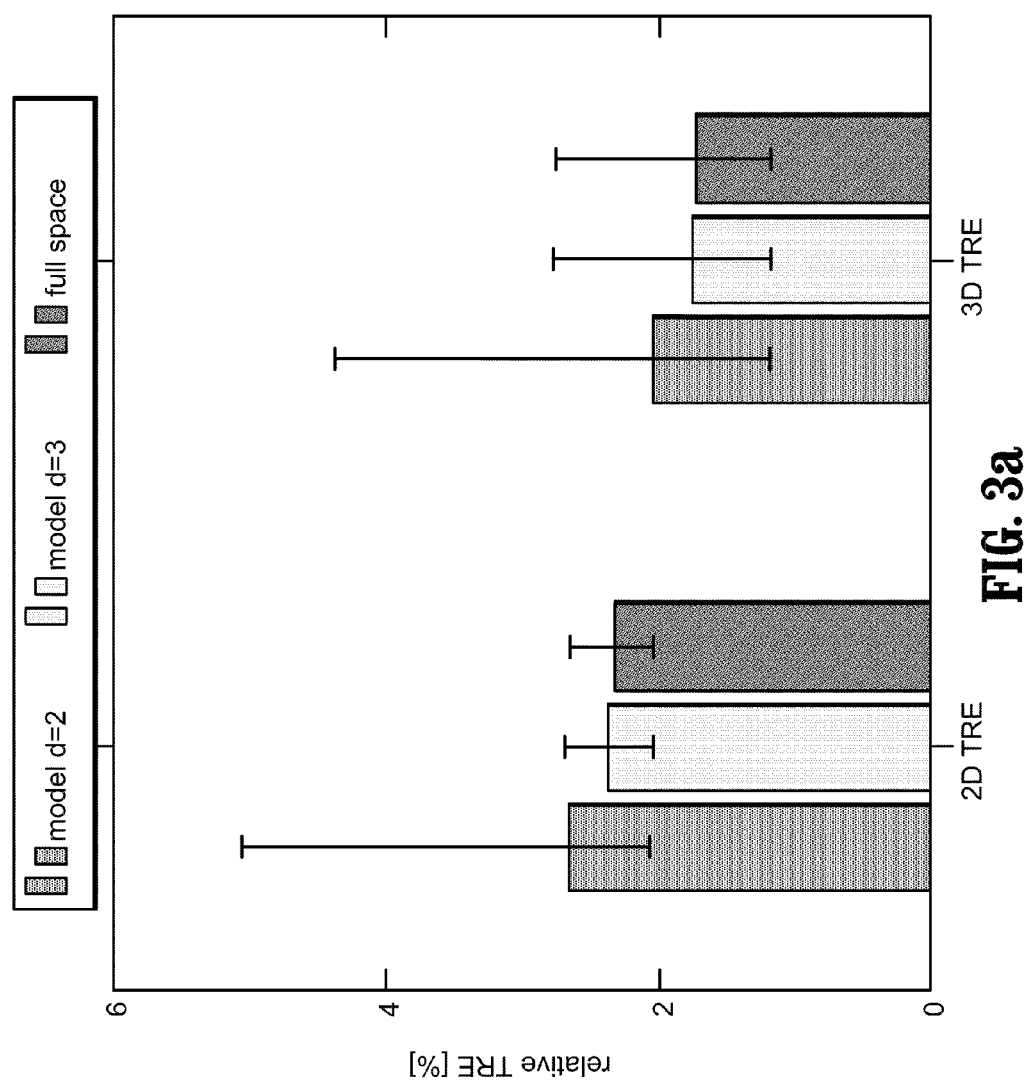
FIG. 3($a$) is a chart that shows the mean relative 2D and 3D TRE for a synthetic data validation simulation on 128-point coronary tree using the method's model-constrained registration approach with model dimensions d=2 and d=3 compared to unconstrained registration optimization.

To assess its benefits, the method's model-constrained registration approach was compared to unconstrained registration ("full-space registration approach") in terms of accuracy, robustness and speed. Concerning the registration accuracy, the 2D and 3D target-to-registration error (TRE) were each considered. The 3D TRE computes the average spatial distance between the imaginary 3D observation (target) and the arterial 3D centerline segmentation $Y_0$ transformed by the result of the 2D-3D registration $\hat{m}_k$. The mean ($\|\cdot\|_{L_2}$) of the point-wise difference vectors was chosen as a distance measure. The 2D TRE was computed correspondingly after projecting to the camera space. It is a measure for the perceived error when looking at the angiographies, whereas the 3D TRE better reflects the true 3D mismatch. Nevertheless, both 2D and 3D TREs show the same pattern illustrated in FIG. 3(*a*). FIG. 3(*a*) shows the mean relative 2D and 3D TRE for the simulation on a 128-point coronary tree using the method's model-constrained registration approach with model dimensions d=2 and d=3 compared to the unconstrained, full-space registration approach. Error bars show minimum and maximum relative TRE. Even if the method's model-constrained registration approach for model dimension d=2 results in a slightly larger TRE compared to the full-space registration approach, the differences become marginal for model dimension d=3.

There is a remarkable difference in terms of speed, though, which was benchmarked based on the average number of cost function evaluations until convergence was reached. For the simulation, the number of iterations linearly decreased with the number of registration optimization parameters from 112±23 for the unconstrained registration approach to 58±11 for d=3 and 42±8 for d=2, respectively, for the method's model-constrained registration approach.

Figure 3B:
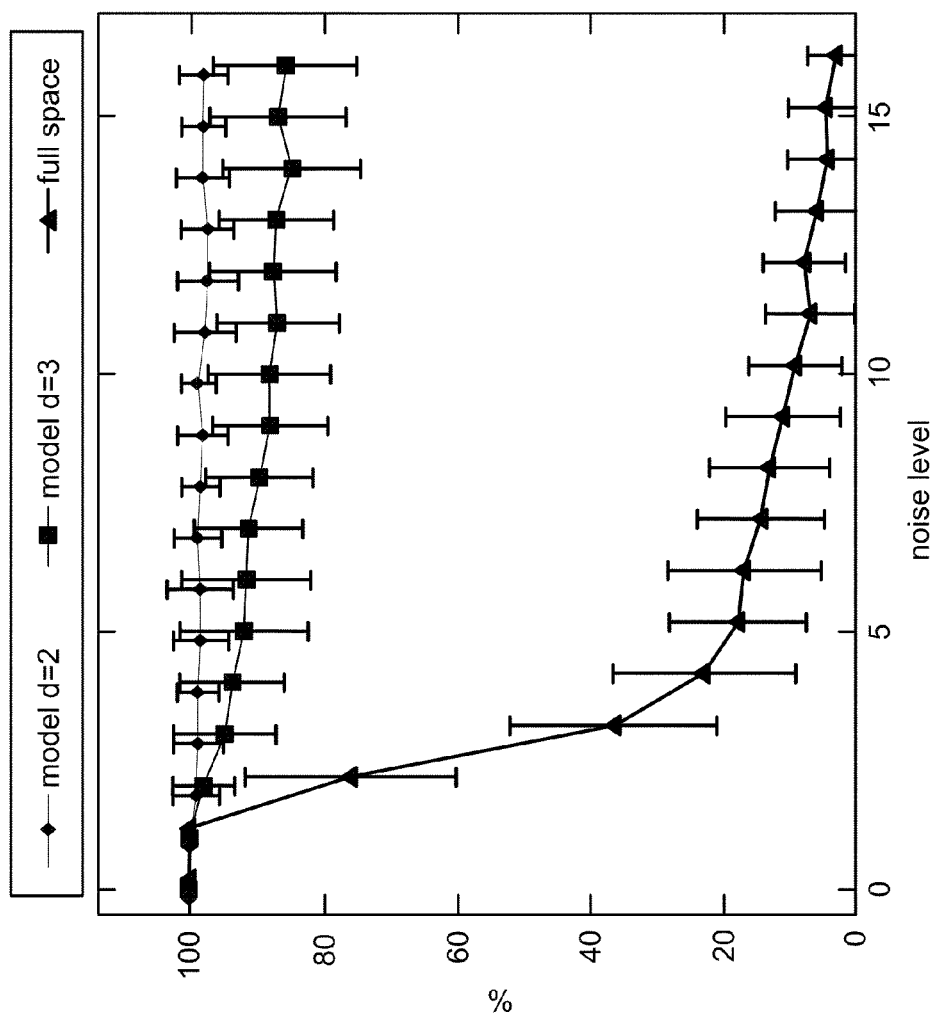

Finally, the capture range was analyzed to compare the robustness of the two approaches. The registration was initialized with different initial guesses with subsequently added Gaussian noise starting from the optimal initial guess closest to the random sample of the motion generator. FIG. 3(b) confirms that the utilization of prior information on breathing motion within the registration process (i.e., the method's model-constrained registration approach) results in much better robustness, whereas the full-space registration optimization fails to converge to a reasonable solution even for small noise levels. FIG. 3(b) shows the mean ratio of converged solutions for initial guesses at different noise levels for the two approaches. A threshold of 5% for the mean 3D TRE was used as convergence criterion. Error bars show standard deviation.

Figure 4A:
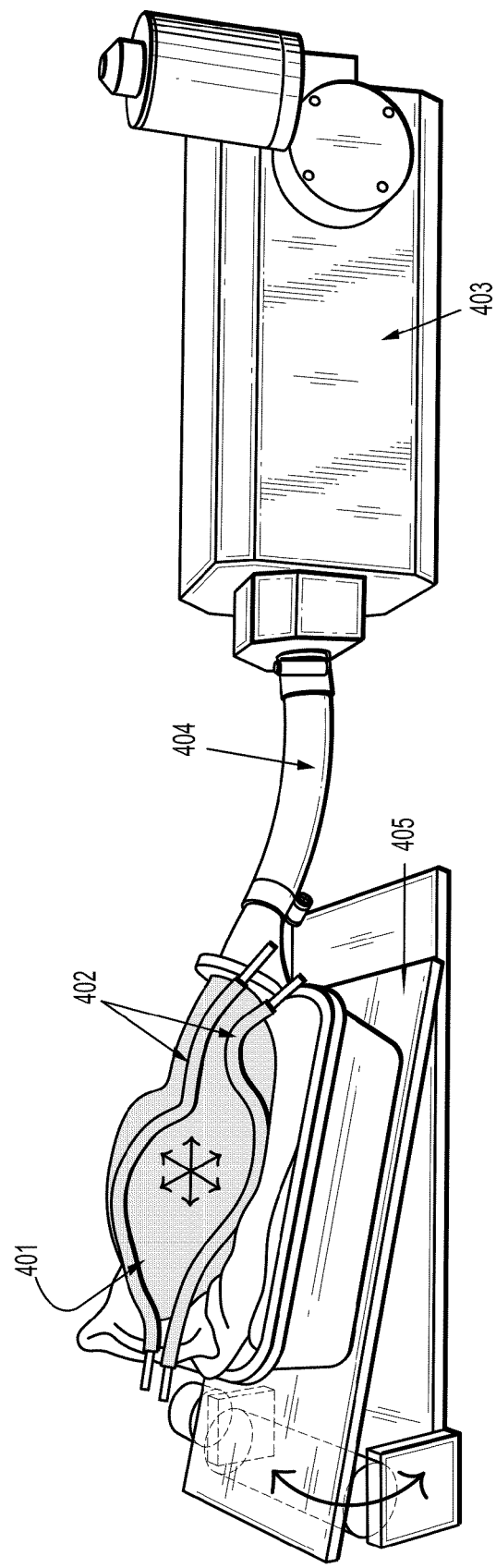
FIG. 4($a$) is a photograph of a cardiac phantom installation with a simulation mechanism for cardiac and respiratory motions for a phantom data validation experiment using the method's model-constrained registration approach with model dimensions d=2 and d=3 compared to unconstrained registration optimization.

Phantom data experiment: This experiment was carried out on a biplane C-arm system (specifically, the AXIOM® Artis® by Siemens Medical Solutions of Erlangen, Germany). Fluoroscopic image sequences were acquired of a sophisticated cardiac phantom which is capable of simulating cardiac and respiratory motions. FIG. 4(a) shows the cardiac phantom installation with a simulation mechanism for cardiac and respiratory motions. The phantom comprises a fluid-filled balloon (representing a patient's heart) surrounded by small tubes (representing a patient's coronary arteries). An external pump periodically inflates and deflates the balloon (representing cardiac motion) which is mounted on a ramp that changes its incline periodically by being mechanically lifted and lowered (representing respiratory motion).

Figure 4B:
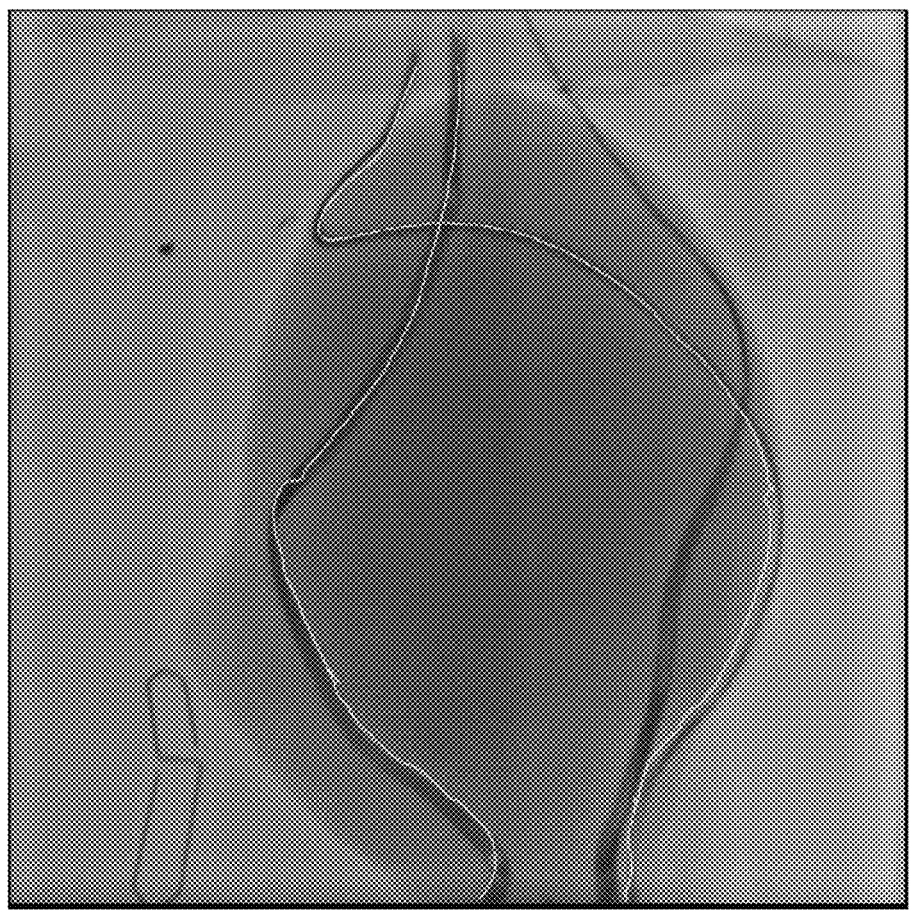
Figure 5A:
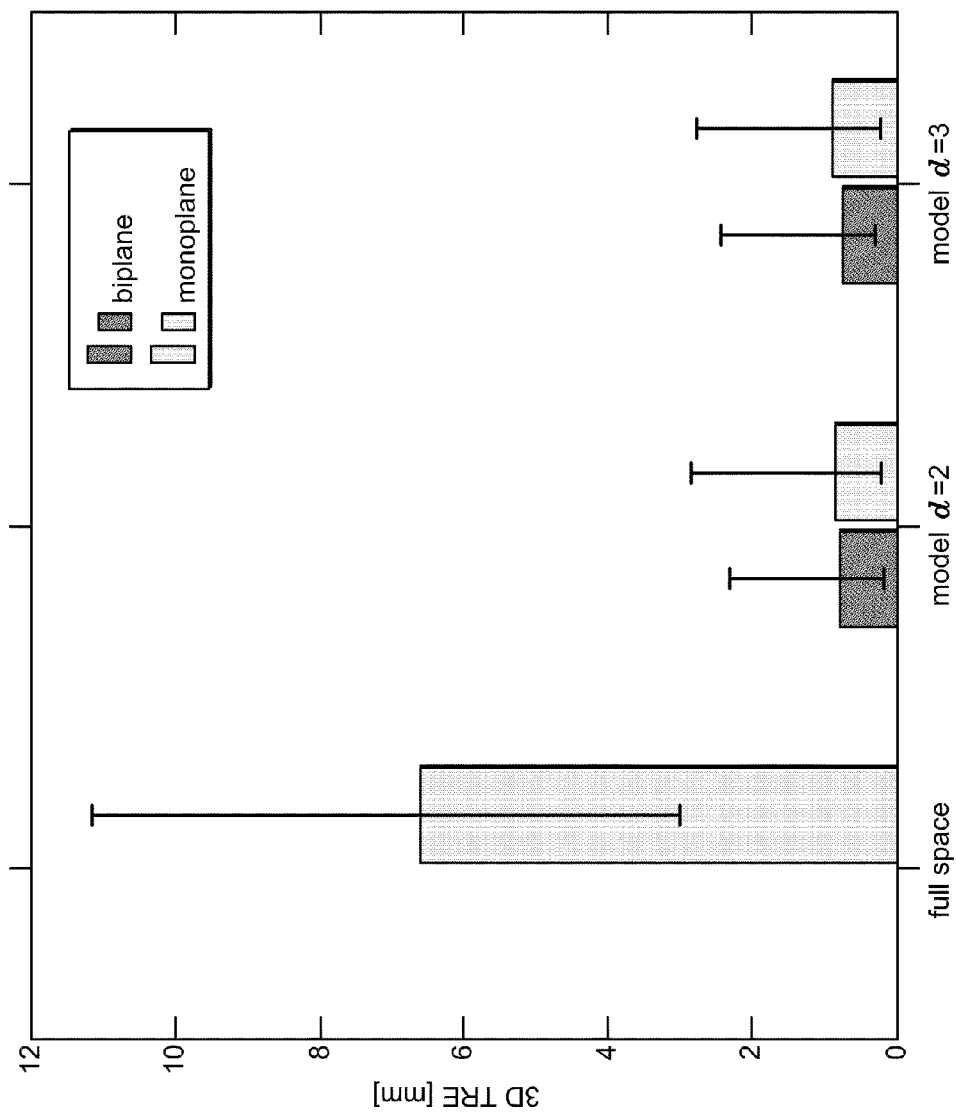
FIG. 5($a$) is a chart that shows the mean 3D TRE of the phantom data validation experiment referenced by FIG. 4($a$) for monoplane and biplane settings.
FIG. 5(b) is a chart that shows the mean 3D TRE of a clinical data validation experiment for monoplane and biplane settings using the method's model-constrained registration approach with model dimensions d=2 and d=3 compared to unconstrained registration optimization.

FIG. 4(b) shows an X-ray image of the cardiac phantom with a registered "coronary" centerline. The 3D centerline $Y_0$ was reconstructed from a CT scan of the cardiac phantom. For the initial motion model estimation, a 2D biplane sequence was acquired of the phantom with simulated cardiac and respiratory motions. After applying ECG-gating, and initial registration, this data provided 7 samples at different breathing phases which served as training data for the motion model. The estimated motion model was then validated using a second 2D biplane sequence of 61 images covering the whole breathing cycle with cardiac motion disabled. FIG. 5(a) illustrates the average 3D TRE for the experiment using the method's model-constrained registration approach with model dimensions d=2 and d=3 compared to unconstrained registration optimization, where the unconstrained 2D biplane registration is considered as ground-truth (target) after visual inspection. The motion model of dimension d trained on N=7 samples. Error bars show minimum and maximum TRE, respectively. The 3D accuracy of the method's model-constrained registration approach is in the range of 1 mm, which results in an accurate matching of the ground-truth in the 2D projections.

One of the major advantages of the model-constrained registration approach appears when applying it on an intra-operative 2D monoplane setting. In this case, the 2D biplane information is used for the initial motion model estimation only. The subsequent re-registrations, however, are done using only one of the two sequences. Even when the unconstrained registration matches the considered monoplane view almost perfectly, it shows a significant mismatch for the unconsidered view. This discrepancy is reflected in the resulting average 3D TRE shown in FIG. 5(a). The method's model-based registration approach turns out to be superior and much more robust in this case. The underlying motion model restricts the choice of the registration optimization parameters for the considered view so that the registration will still converge to a reasonable solution and does not end up in a false negative.

In terms of speed, the number of cost function evaluations for the 2D biplane setting were reduced from 627±126 iterations for the unconstrained registration approach to 47±4 (for d=2) and 73±7 (for d=3), respectively, for the method's model-constrained registration approach. For the 2D monoplane setting, a similar pattern was obtained. Because of its small capture range, the unconstrained registration approach requires an initial optimization step to get a close initial guess for the core registration optimization, which increases the number of cost function evaluations.

Figure 6:
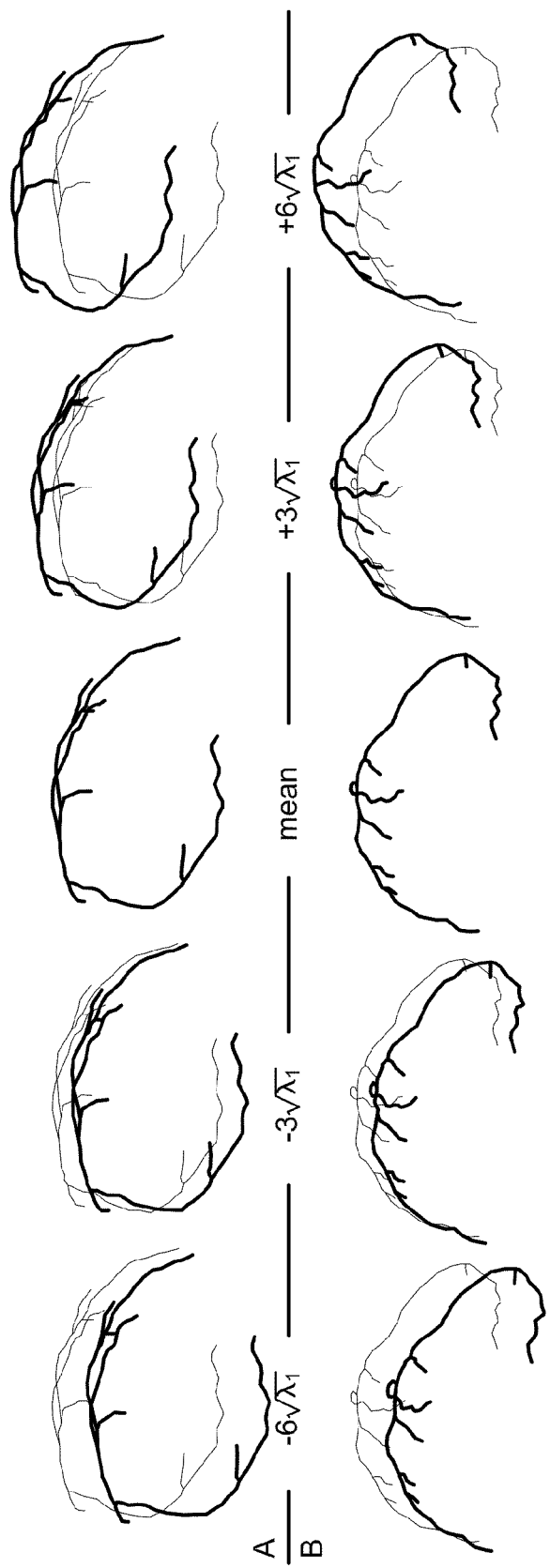
FIG. 6 is a visualization display of the motion profile captured by the first major mode in the range of $\pm 6\sqrt{\lambda_1}$ for the patient dataset for the clinical data validation experiment referenced by FIG. 5(b)

Clinical data experiment: The above experiments were repeated on patient data obtained from a coronary intervention case. Most angiographies acquired during actual clinical interventions are relatively short to minimize dose and contrast agent. In contrast, long sequences are needed for a reliable motion model estimation and especially for validation of the method's model-constrained registration approach. Therefore, preliminary results were obtained on one angiography providing 5 gated samples at different breathing phases (similar, for example, to those shown in FIG. 2). The motion model, which is trained on these samples, captures a complex motion profile that describes the characteristics of the patient-specific respiratory motion. This is illustrated in FIG. 6 which is a visualization of the motion profile captured by the first major mode in the range of $\pm 6\sqrt{\lambda_1}$ for the patient dataset. The mean transform $\overline{m}$ is shown in a lighter shade.

A "leave-out-one" strategy was used to train the motion model on four samples and validated for the remaining one. FIG. 5(b) shows the average 3D TRE for the monoplane and biplane configurations for the experiment using the method's model-constrained registration approach with model dimensions d=2 and d=3 compared to unconstrained registration optimization. The motion model of dimension d trained on N=4 samples. Error bars show minimum and maximum TRE, respectively. FIG. 5(b) shows the same pattern as the one obtained for the phantom data experiments shown in FIG. 5(a). The method's model-constrained registration 3D TRE is in the range of 1 mm and slightly increases for the monoplane setting, whereas the unconstrained registration obviously converges to a false-negative in the monoplane setting. When considering all five samples of the biplane sequence to compute the average 3D TRE, it even drops to well below 1 mm for the model-constrained registration approach.

Figure 7:
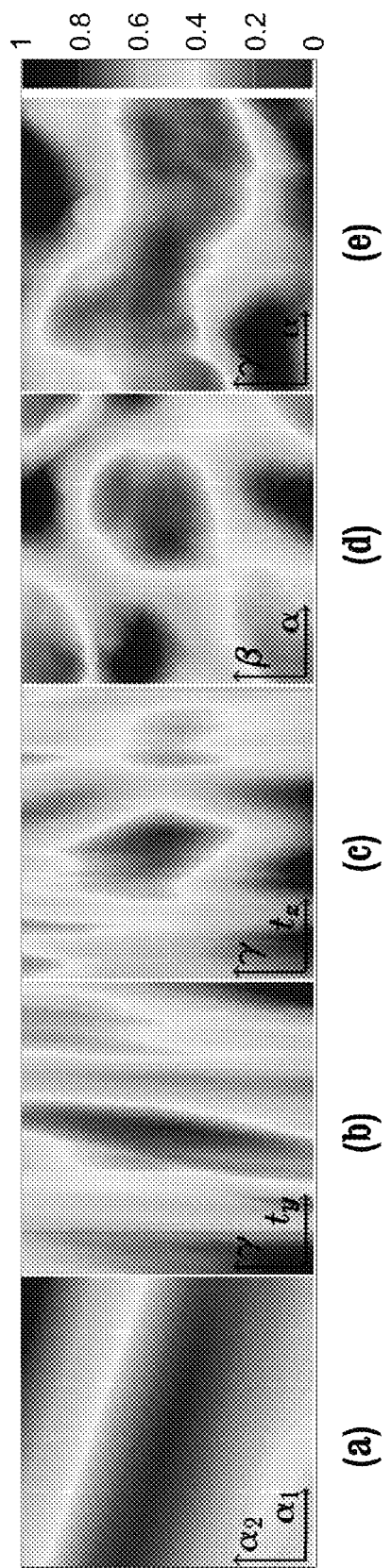
FIG. 7 is a visualization of normalized cost function evaluated in the neighborhood of the global minimum (image centers) for varying motion model parameters $\alpha_1$ and $\alpha_2$(a) and different combinations of translation $t_{(x,y,z)}$ and rotation angles $\alpha, \beta, \gamma$ (b-e) for the clinical data validation experiment referenced by FIG. 5(b).

Incorporating the method's motion model into the registration algorithm reduces the search space and hence accelerates the overall method, but also provides a better parameterization of the search space that fits to the input data. The re-parameterization has a crucial effect on the shape of the cost function as illustrated in FIG. 7. FIG. 7 shows normalized cost function evaluated in the neighborhood of the global minimum (image centers) for varying motion model parameters $\alpha_1$ and $\alpha_2$(a) and different combinations of translation $t_{(x,y,z)}$ and rotation angles $\alpha$, $\beta$, $\gamma$ (b-e). The cost function shows a much smoother profile for the method's motion model parameterization, suggesting that the constrained registration optimization problem is well-posed, as opposed to the unconstrained registration optimization where we can see conspicuous local extrema, indicating that the problem is at-least, ill-conditioned.

Several conclusions were obtained from the validation experiments/simulations. First, the method's model-constrained registration approach was validated for synthetic data. The method's motion model provided a beneficial parameterization of the search space and a reasonable way of restricting it, which eventually made the model-constrained registration algorithm more robust and faster without compromising on registration accuracy. The prospective use of the method's model-constrained registration was tested using phantom and clinical data. Those experiments showed that a low-dimensional motion model is able to capture the respiratory motion profile and has a smoothing effect on the cost function, which makes the model-constrained registration more robust and achieves a registration accuracy of less than 2 mm even for an intra-operative 2D monoplane setting.

Other modifications are possible within the scope of the invention. For example, the subject patient to be scanned may be an animal subject or any other suitable object instead of a human patient. Also, although the steps of each method have been described in a specific sequence, the order of the steps may be re-ordered in part or in whole. Further, although in the described methods the medical professional may use self-contained imaging instrumentation and tools, the medical professional may use other instrumentation or tools in combination with or in place of the imaging instrumentation and tools described for any step or all the steps of the methods, including those that may be made available via telecommunication means. Further, the described methods, or any of their steps, may be carried out automatically by appropriate imaging instrumentation and tools or with some or minimal manual intervention.

What is claimed is:

1. A computer implemented method of cardiac imaging, comprising the steps of:
   a. registering a pre-operative 3D volumetric dataset of a subject's coronary arteries with an ECG-gated angiogram sequence of a subject's heart;
   b. adjusting the registration of the pre-operative volumetric dataset with one of said ECG-gated angiograms using a respiratory motion reference model that optimizes 6 or fewer parameters that describe a rigid transform to estimate coronary pose parameters from similarity measures describing a distance between a set of 2D biplane fluoroscopic images and a coronary centerline in the pre-operative volumetric dataset;
   c. registering the pre-operative 3D volumetric dataset of the subject's coronary arteries with additional angiogram sequences of the subject's heart by using the reference model to restrict optimization of image alignments; and
   d. presenting registration results to respective cardiac imaging users,
   wherein said reference model of respiratory motion is a patient-specific model trained in a preparatory training phase, including
   acquiring an initial sequence of ECG-gated 2D biplane X-ray angiograms;
   registering a pre-operative 3D segmentation of the coronary arteries with the ECG-gated 2D biplane X-ray angiogram sequence; and
   estimating the pose of the vasculature in each sequence image by applying a feature-based rigid 2D/3D registration algorithm that best maps a pre-operative 3D centerline segmentation of the coronary arteries to the 2D biplane X-ray angiograms, wherein the coronary centerline is reconstructed from the pre-operative 3D segmentation,
   wherein for each breathing phase, an estimate for the cardiac pose represented by a rigid transform that forms a linear sub-manifold embedded in a six dimensional space of a rigid 3D transformation is obtained from a basis of a d-dimensional linear sub-manifold, d<=6, identified from a first d eigenvectors corresponding to a d largest eigenvalues of a covariance matrix of the linear sub-manifold.

2. The computer implemented method of claim 1, wherein the pre-operative 3D volumetric dataset comprises a 3D coronary tree image of the cardiac target site.

3. The computer implemented method of claim 2, wherein the 3D coronary tree image is reconstructed from a pre-operative CT scan of the patient.

4. The computer implemented method of claim 1, wherein registering a pre-operative 3D volumetric dataset of a subject's coronary arteries with an ECG-gated angiogram sequence of a subject's heart comprises overlaying the 3D coronary tree image onto the ECG-gated 2D fluoroscopic angiogram sequence of images and optimizing an alignment therebetween.

5. The computer implemented method of claim 4, wherein the respiratory motion model is defined using principle component analysis on cardiac imaging samples that are obtained using 2D/3D registration of a pre-operative 3D segmentation of the coronary arteries of the patient with an ECG-gated 2D fluoroscopic angiogram sequence.

6. A non-transitory program storage device readable by a computer, tangibly embodying a program of instructions executed by the computer to perform a method for cardiac imaging, the method comprising the steps of:
   a. registering a pre-operative 3D volumetric dataset of a subject's coronary arteries with an ECG-gated angiogram sequence of a subject's heart;
   b. adjusting the registration of the pre-operative volumetric dataset with one of said ECG-gated angiograms using a respiratory motion reference model that optimizes 6 or fewer parameters that describe a rigid transform to estimate coronary pose parameters from similarity measures describing a distance between a set of 2D biplane fluoroscopic images and a coronary centerline in the pre-operative volumetric dataset;
   c. registering the pre-operative 3D volumetric dataset of the subject's coronary arteries with additional angiogram sequences of the subject's heart by using the reference model to restrict optimization of image alignments; and
   d. presenting registration results to respective cardiac imaging users,
   wherein said reference model of respiratory motion is a patient-specific model trained in a preparatory training phase, including
   acquiring an initial sequence of ECG-gated 2D biplane X-ray angiograms;
   registering a pre-operative 3D segmentation of the coronary arteries with the ECG-gated 2D biplane X-ray angiogram sequence; and
   estimating the pose of the vasculature in each sequence image by applying a feature-based rigid 2D/3D registration algorithm that best maps a pre-operative 3D centerline segmentation of the coronary arteries to the 2D biplane X-ray angiograms, wherein the coronary centerline is reconstructed from the pre-operative 3D segmentation, wherein for each breathing phase, an estimate for the cardiac pose represented by a rigid transform that forms a linear sub-manifold embedded in a six dimensional space of a rigid 3D transformation is obtained from a basis of a d-dimensional linear sub-manifold, $d<=6$, identified from a first d eigenvectors corresponding to a d largest eigenvalues of a covariance matrix of the linear sub-manifold.

7. The computer readable program storage device of claim 6, wherein the pre-operative 3D volumetric dataset comprises a 3D coronary tree image of the cardiac target site.

8. The computer readable program storage device of claim 7, wherein the 3D coronary tree image is reconstructed from a pre-operative CT scan of the patient.

9. The computer readable program storage device of claim 6, wherein registering a pre-operative 3D volumetric dataset of a subject's coronary arteries with an ECG-gated angiogram sequence of a subject's heart comprises overlaying the 3D coronary tree image onto the ECG-gated 2D fluoroscopic angiogram sequence of images and optimizing an alignment therebetween.

10. The computer readable program storage device of claim 9, wherein the respiratory motion model is defined using principle component analysis on cardiac imaging samples that are obtained using 2D/3D registration of a pre-operative 3D segmentation of the coronary arteries of the patient with an ECG-gated 2D fluoroscopic angiogram sequence.

11. A method for cardiac imaging, comprising the steps of:
registering a pre-operative 3D volumetric dataset of a subject's coronary arteries with an ECG-gated angiogram sequence of a subject's heart;

adjusting the registration of the pre-operative volumetric dataset with one of said ECG-gated angiograms using a respiratory motion reference model; and registering the pre-operative 3D volumetric dataset of the subject's coronary arteries with additional angiogram sequences of the subject's heart by using the reference model to restrict optimization of image alignments; and presenting registration results to respective cardiac imaging users, wherein said reference model of respiratory motion is a patient-specific model trained by acquiring an initial sequence of ECG-gated 2D biplane X-ray angiograms;

registering a pre-operative 3D segmentation of the coronary arteries with the ECG-gated 2D biplane X-ray angiogram sequence; and estimating the pose of the vasculature in each sequence image by applying a feature-based rigid 2D/3D registration algorithm that best maps a pre-operative 3D centerline segmentation of the coronary arteries to the 2D biplane X-ray angiograms, wherein the coronary centerline is reconstructed from the pre-operative 3D segmentation, wherein for each breathing phase, an estimate for the cardiac pose represented by a rigid transform that forms a linear sub-manifold embedded in a six dimensional space of a rigid 3D transformation is obtained from a basis of a d-dimensional linear sub-manifold, $d<=6$, identified from a first d eigenvectors corresponding to a d largest eigenvalues of a covariance matrix of the linear sub-manifold.

12. The method of claim 11, wherein the respiratory motion reference model optimizes 6 or fewer parameters that describe a rigid transform to estimate coronary pose parameters from similarity measures describing a distance between a set of 2D biplane fluoroscopic images and a coronary centerline in the pre-operative volumetric dataset.

* * * * *